(12) United States Patent
Morioka et al.

(10) Patent No.: US 7,947,411 B1
(45) Date of Patent: May 24, 2011

(54) MEMBRANE AND ELECTRODE ASSEMBLY AND METHOD OF PRODUCING THE SAME, AND POLYMER ELECTROLYTE MEMBRANE FUEL CELL

(75) Inventors: Hiroyuki Morioka, Tokyo (JP); Yasuhiro Haba, Tokyo (JP); Saori Okada, Tokyo (JP); Keiichi Iio, Tochigi (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 12/666,900

(22) PCT Filed: Jun. 25, 2008

(86) PCT No.: PCT/JP2008/061514
§ 371 (c)(1),
(2), (4) Date: Feb. 3, 2010

(87) PCT Pub. No.: WO2009/004959
PCT Pub. Date: Aug. 1, 2009

(30) Foreign Application Priority Data

Jun. 29, 2007 (JP) .................................. 2007-172618
Jun. 29, 2007 (JP) .................................. 2007-172643

(51) Int. Cl.
*H01M 2/24* (2006.01)
*B01J 49/00* (2006.01)
(52) U.S. Cl. ........ 429/535; 429/529; 429/534; 429/482; 521/27; 427/115
(58) Field of Classification Search .................. 429/535, 429/523, 529, 532, 534, 482, 483, 480; 521/27, 521/28, 30; 502/101; 427/115
See application file for complete search history.

(56) References Cited

U.S. PATENT DOCUMENTS

| | | | |
|---|---|---|---|
| 5,500,292 | A | 3/1996 | Muranaka et al. |
| 2005/0238800 | A1* | 10/2005 | Shinn et al. .................... 427/115 |
| 2006/0093893 | A1* | 5/2006 | Matsuo et al. .................. 429/44 |
| 2007/0269698 | A1* | 11/2007 | Gu .................................. 429/30 |
| 2009/0239116 | A1 | 9/2009 | Okumura et al. |

FOREIGN PATENT DOCUMENTS

| | | |
|---|---|---|
| JP | 5-251086 | 9/1993 |
| JP | 2001-338654 | 12/2001 |
| JP | 2002-237306 | 8/2002 |
| JP | 2004-127566 | 4/2004 |
| JP | 2006-087651 | 4/2006 |
| JP | 2006-120506 | 5/2006 |
| JP | 2006-252948 | 9/2006 |
| JP | 2006-294594 | 10/2006 |
| JP | 2006-332041 | 12/2006 |
| JP | 2007-080726 | 3/2007 |
| JP | 2007-141588 | 6/2007 |
| JP | 2007-188768 | 7/2007 |
| JP | 2008-27799 | 2/2008 |

* cited by examiner

*Primary Examiner* — Raymond Alejandro
(74) *Attorney, Agent, or Firm* — Weingarten, Schurgin, Gagnebin & Lebovici LLP

(57) ABSTRACT

To provide a membrane and electrode assembly comprising a catalyst layer that improves water holding properties and exhibits high power generation characteristics even in low humidified conditions without inhibiting the diffusibility of reaction gas, the removal of the water generated by the electrode reaction, and its manufacturing method. There is provided a membrane and electrode assembly produced by sandwiching a polymer electrolyte membrane between a pair of catalyst layers, in which the catalyst layer comprises a polymer electrolyte and particles carrying a catalyst material, and in which the volume of fine pores having a diameter of 1.0 μm or smaller is increased toward the polymer electrolyte membrane from the surface of the catalyst layer.

9 Claims, 8 Drawing Sheets (a)

(b)

(a)

(b)

(c)

(d)

(e)

MEMBRANE AND ELECTRODE ASSEMBLY AND METHOD OF PRODUCING THE SAME, AND POLYMER ELECTROLYTE MEMBRANE FUEL CELL

TECHNICAL FIELD

The present invention relates to a membrane and electrode assembly and a method of producing the membrane and electrode assembly, and a polymer electrolyte membrane fuel cell comprising the membrane and electrode assembly. More specifically, the invention relates to a membrane and electrode assembly exhibiting high power generation characteristics under low humidified conditions and a method of producing the membrane and electrode assembly, and a polymer electrolyte membrane fuel cell comprising the membrane and electrode assembly.

BACKGROUND ART

Fuel cells are a power generating system for reacting a hydrogen-containing fuel gas with an oxygen-containing oxidant gas, i.e., causing an inverse reaction of the electrolysis of water on electrodes including a catalyst, to generate heat and at the same time electricity. This power generating system is high efficient and has features of low environmental loads and low noises, etc. as compared with conventional power generation methods and has been receiving attention as a clean energy source in the future. There are some types depending on the kinds of ionic conductors to be used and a type that uses a proton conducting polymer membrane is called a polymer electrolyte membrane fuel cell.

Polymer electrolyte membrane fuel cells among fuel cells are usable in the vicinity of room temperature, so that their use for vehicle power sources and stationary power supplies for homes has a bright prospect, and a variety of researches and developments have been going on recently. The polymer electrolyte membrane fuel cell is a cell sandwiched with a pair of separator plates in which gas passages for supplying a fuel gas containing hydrogen to one electrode and an oxidant gas containing oxygen to the other electrode are formed in an assembly produced by placing the pair of the catalyst layers on both sides of a polymer electrolyte membrane called a membrane and electrode assembly (hereinafter, may be abbreviated as MEA). Here, the electrode to which the fuel gas is fed is called anode and the electrode to which the oxidant is fed is called cathode. These electrodes include a catalyst layer produced by laminating carbon particles carrying a catalyst material such as a platinum-based noble metal to a polymer electrolyte and a gas diffusion layer having both gas permeability and electron conductivity.

Here, approaches that improve gas diffusibility have been performed on the catalyst layer in order to improve the output density of the fuel cell. Fine pores in the catalyst layer are located ahead through the gas diffusion layer and serve as a passage that transports a plurality of substances.

The anode plays the roles of not only smoothly feeding a fuel gas to a three-phase interface, which is an oxidation-reduction reaction field, but feeding water for smoothly conducting generated protons within the polymer electrolyte membrane.

The cathode plays the roles of feeding an oxidant gas as well as smoothly removing the water generated by electrode reaction. Techniques that improves drainage have been developed to prevent stopping of the power generation reaction due to the obstruction of mass transport, i,e., a phenomenon so-called "flooding". (See, for example, Patent Documents 1 to 4)

The greatest challenge is to lower the cost although subjects for the practical use of polymer electrolyte membrane fuel cells include, for example, improvement of the output density and durability.

One means for lowering the cost includes the reduction of the humidifier. Though a perfluorosulfonic acid film or a hydrocarbon film is widely used for the polymer electrolyte membrane located in the center of the membrane and electrode assembly, moisture control near a saturated water vapor pressure is needed to obtain excellent proton conductivity, and water is supplied from the outside using a humidifier presently. Hence, the development of polymer electrolyte membranes is in progress that exhibit sufficient proton conductivity by low humidification and that do not need a humidifier, for low power consumption and the simplification of the system.

However, in a catalyst layer improved in drainage, the polymer electrolyte is dried up in low humidified conditions, whereby there is a need to optimize the catalyst layer structure and improve water holding properties. Up to now, for example, a method of sandwiching a humidity controlling membrane between the catalytic electrode layer and the gas diffusion layer is devised for improving water holding properties of the fuel cell in low humidified conditions.

In Patent Document 5, a method is devised in which a humidity controlling membrane made from a conductive carbonaceous powder and polytetrafluoroethylene offers a humidity control function and prevents drying up.

In Patent Document 6, a method is devised in which a groove is disposed in the surface of the catalytic electrode layer that makes contact with the polymer electrolyte membrane. The method is devised in which the groove having a width of 0.1 to 0.3 mm is formed to thereby suppress a decrease in power generation performance in low humidified conditions.

Patent Document 1: Japanese Patent Application Laid-Open No. 2006-120506
Patent Document 2: Japanese Patent Application Laid-Open No. 2006-332041
Patent Document 3: Japanese Patent Application Laid-Open No. 2006-87651
Patent Document 4: Japanese Patent Application Laid-Open No. 2007-80726
Patent Document 5: Japanese Patent Application Laid-Open No. 2006-252948
Patent Document 6: Japanese Patent Application Laid-Open No. 2007-141588

DISCLOSURE OF THE INVENTION

Problems to be Solved by the Invention

However, in the membrane and electrolyte assemblies obtained by the cited documents, the assembly between the members is lowered as compared with that made by the conventional method, thus posing the problem that the assembly does not have satisfactory power generation performance. In addition, there is a problem in that the manufacturing methods are complicated.

Accordingly, a first object of the present invention is to provide a membrane and electrode assembly comprising a catalyst layer that improves water holding properties and exhibits high power generation characteristics even in low humidified conditions without inhibiting the diffusibility of the reaction gas, the removal of the water generated by the electrode reaction, etc.

A second object of the present invention is to provide a method of producing a membrane and electrode assembly that can efficiently, economically and easily produce such membrane and electrode assembly.

A third object of the present invention is to provide a polymer electrolyte membrane fuel cell comprising such membrane and electrode assembly.

Means for Solving the Problems

The present inventor has diligently studied and concluded that the invention according to claim 1 for solving the above problems is a membrane and electrode assembly produced by sandwiching a polymer electrolyte membrane between a pair of catalyst layers, in which the above catalyst layer comprises a polymer electrolyte and particles carrying a catalyst material, and in which the volume of fine pores having a diameter of 1.0 μm or smaller in terms of cylinder approximation for fine pores evaluated by the mercury intrusion method in the above catalyst layer is increased toward the above polymer electrolyte membrane (the inside) from the surface of the catalyst layer (the outside).

Furthermore, the invention according to claim 2 is the membrane and electrode assembly described in claim 1, in which the above catalyst layer is made by laminating at least two kinds of catalyst layers having different volumes of fine pores with a diameter of 1.0 μm or smaller in terms of cylinder approximation for fine pores evaluated by the above mercury intrusion method.

In addition, the invention according to claim 3 is the membrane and electrode assembly described in claim 2, in which the difference between the highest and lowest values in the thickness direction of the volume of fine pores with a diameter of 1.0 μm or smaller in the above catalyst layer in terms of cylinder approximation for fine pores evaluated by the above mercury intrusion method is 0.1 mL/g(catalyst layer) or larger and 1.0 mL/g(catalyst layer) or smaller.

Additionally, the invention according to claim 4 is the membrane and electrode assembly described in claim 1, in which the volume of fine pores with a diameter of 1.0 μm or smaller in the above catalyst layer in terms of cylinder approximation for fine pores evaluated by the above mercury intrusion method is continuously increased in the thickness direction toward the above polymer electrolyte membrane (the inside) from the surface of the catalyst layer (the outside).

Moreover, the invention according to claim 5 is the membrane and electrode assembly described in claim 4, in which the difference between volumes of fine pores with a diameter of 1.0 μm or smaller of two catalyst layers is 0.1 mL/g(catalyst layer) or larger and 1.0 mL/g(catalyst layer) or smaller in terms of cylinder approximation for fine pores evaluated by the above mercury intrusion method, when the above catalyst layer is divided into equivalents in the thickness direction.

In addition, the invention according to claim 6 is a polymer electrolyte membrane fuel cell, in which the membrane and electrode assembly described in any one of claims 1 to 5 is sandwiched between a pair of gas diffusion layers and further the membrane and electrode assembly sandwiched between the above gas diffusion layers is sandwiched between a pair of separators.

Additionally, the invention according to claim 7 is a method of producing a membrane and electrode assembly produced by sandwiching a polymer electrolyte membrane between a pair of catalyst layers, in which a membrane and electrode assembly comprising a catalyst layer in which the volume of fine pores having a diameter of 1.0 μm or smaller in terms of cylinder approximation for fine pores evaluated by the mercury intrusion method is increased toward the above polymer electrolyte membrane (the inside) from the surface of the catalyst layer (the outside) is produced by steps (1) to (3) described below.

Step (1) is a step of producing a catalyst ink made by dispersing particles carrying a catalyst material and a polymer electrolyte in a solvent, the above volumes of fine pores formed in the catalyst layers being different from each other.

Step (2) is a step of applying catalyst inks in the order of increasing the above volume of fine pores formed in the catalyst layer, or applying catalyst inks in the order of decreasing the above volume of fine pores formed in the catalyst layer, onto a substrate selected from a gas diffusion layer, transfer sheet and polymer electrolyte membrane, to thereby form, on the above substrate, a multilayered catalyst layer in which the volumes of fine pores are sequentially changed.

Step (3) is a step of joining the catalyst layer formed on the above substrate to both sides of the polymer electrolyte membrane when the above substrate is a gas diffusion layer or transfer sheet.

Additionally, the invention according to claim 8 is a method of producing a membrane and electrode assembly produced by sandwiching a polymer electrolyte membrane between a pair of catalyst layers, in which a membrane and electrode assembly comprising a catalyst layer in which the volume of fine pores having a diameter of 1.0 μm or smaller in terms of cylinder approximation for fine pores evaluated by the mercury intrusion method is increased toward the above polymer electrolyte membrane (the inside) from the surface of the catalyst layer (the outside) is produced by steps (1) to (3) described below.

Step (1) is a step of dispersing particles carrying a catalyst material and a polymer electrolyte in a solvent to produce a catalyst ink.

Step (2) is a step of applying the above catalyst ink onto a substrate selected from a gas diffusion layer and a transfer sheet to form a coating film, drying the coating film to remove the solvent in the coating film and to form a catalyst layer, a step of giving a temperature to the opposite side of the substrate of the coating film higher than a temperature to the face of the coating film on the substrate side in the thickness direction of the coating film when the coating film formed on the substrate is dried to remove the solvent.

Step (3) is a step of joining the catalyst layer formed on the above substrate to the above polymer electrolyte membrane.

Furthermore, the invention according to claim 9 is the method of producing the membrane and electrode assembly described in claim 8, in which in the drying of the coating film of step (2) above, the temperature given to the surface opposite to the substrate of the coating film is from [(temperature given to substrate side)+5° C.] to 150° C., both inclusive.

In addition, the invention according to claim 10 is a membrane and electrode assembly produced by the manufacturing method described in any one of claims 7 to 9.

Additionally, the invention according to claim 11 is a polymer electrolyte membrane fuel cell, in which the membrane and electrode assembly described in claim 10 is sandwiched between a pair of gas diffusion layers and further the membrane and electrode assembly sandwiched with the above gas diffusion layers is sandwiched between a pair of separators.

Moreover, the invention according to claim 12 is a substrate comprising a catalyst layer on one side thereof, in which the substrate is selected from a gas diffusion layer or a transfer sheet, the above catalyst layer comprises a polymer electrolyte and particles carrying a catalyst material, and the volume of fine pores with a diameter of 1.0 μm or smaller in the above catalyst layer in terms of cylinder approximation for fine pores evaluated by the above mercury intrusion method is decreased toward the above substrate (the inside) from the surface of the catalyst layer (the outside).

Furthermore, the invention according to claim 13 is the substrate described in claim 12, in which the above catalyst layer is made by laminating at least two kinds of catalyst layers having different volumes of fine pores with a diameter of 1.0 μm or less in terms of cylinder approximation for fine pores evaluated by the above mercury intrusion method.

In addition, the invention according to claim 14 is the substrate described in claim 13, in which the difference between the highest and lowest values in the thickness direction of the volume of fine pores with a diameter of 1.0 μm or less in the above catalyst layer in terms of cylinder approximation for fine pores evaluated by the above mercury intrusion method is 0.1 mL/g(catalyst layer) or larger and 1.0 mL/g(catalyst layer) or smaller.

Additionally, the invention according to claim 15 is the substrate described in claim 12, in which the volume of fine pores with a diameter of 1.0 μm or less in the thickness direction in the above catalyst layer in terms of cylinder approximation for fine pores evaluated by the above mercury intrusion method is continuously decreased toward the above substrate (the inside) from the surface of the catalyst layer (the outside) in the thickness direction.

Moreover, the invention according to claim 16 is the substrate described in claim 15, in which the difference between volumes of fine pores with a diameter of 1.0 μm of two catalyst layers is 0.1 mL/g(catalyst layer) or larger and 1.0 mL/g(catalyst layer) or smaller in terms of cylinder approximation for fine pores evaluated by the above mercury intrusion method, when the above catalyst layer is divided into equivalents in the thickness direction.

Advantages of the Invention

The membrane and electrode assembly of the present invention is characterized in that the volume of fine pores having a diameter of 1.0 μm or smaller in terms of cylinder approximation for fine pores evaluated by the mercury intrusion method is increased toward the above polymer electrolyte membrane (the inside) from the surface of the catalyst layer (the outside), so that the water holding properties may be improved without inhibiting the removal of the water generated by the electrode reaction to produce a membrane and electrode assembly comprising a catalyst layer exhibiting high power generation characteristics even under low humidified conditions, thus producing a polymer electrolyte membrane fuel cell exhibiting high power generation characteristics.

In addition, the use of the method of producing the membrane and electrode assembly of the present invention makes it possible to efficiently, economically and readily produce a membrane and electrode assembly in which the volume of fine pores having a diameter of 1.0 μm or smaller in terms of cylinder approximation for fine pores evaluated by the mercury intrusion method is increased toward the above polymer electrolyte membrane (the inside) from the surface of the catalyst layer (the outside).

BEST MODES FOR CARRYING OUT THE INVENTION

The membrane and electrode assembly (MEA), its manufacturing method and the polymer electrolyte membrane fuel cell, of the present invention, will be described below. In addition, the present invention is not intended to be limited to each embodiment described below, variations such as a change in designing based on knowledge of those skilled in the art can also be added, and an embodiment to which such change is added is also included in the scope of the invention.

First, the membrane and electrode assembly of the invention will be set forth.

A schematic sectional view of the inventive membrane and electrode assembly is shown in FIG. 1. A membrane and electrode assembly (MEA) 12 of the invention has catalyst layers 2 and 3 joined on both sides of a solid polymer electrolyte membrane 1 and thus has a sandwiched structure. In the inventive membrane and electrode assembly, at least one of the catalyst layers includes a polymer electrolyte and particles carrying a catalyst and a polymer electrolyte. The membrane and electrode assembly of the present invention is characterized in that in the above catalyst layer, the volume of fine pores having a diameter of 1.0 μm or smaller in terms of cylinder approximation for fine pores evaluated by the mercury intrusion method is increased toward the above polymer electrolyte membrane (the inside) from the surface of the catalyst layer (the outside).

The membrane and electrode assembly for reference includes, as illustrated in FIG. 1(a), a membrane and electrode assembly produced by a catalyst layer of a multilayered structure made by laminating two or more layers different in volumes of fine pores with a diameter of 1.0 μm or smaller in terms of cylinder approximation for fine pores evaluated by the mercury intrusion method. In this case, the catalyst layers located inside are catalyst layers 2b and 3b the volume of fine pores of which is larger than that of the catalyst layers located outside; the catalyst layers located outside are catalyst layers 2a and 3a the volume of fine pores of which is smaller than that of the catalyst layers located inside.

The membrane and electrode assembly of the present invention includes, as shown in FIG. 1(b), a membrane and electrode assembly comprising a catalyst layer in which the volume of fine pores with a diameter of 1.0 μm or smaller in terms of cylinder approximation for fine pores evaluated by the above mercury intrusion method is continuously increased in the thickness direction toward the above polymer electrolyte membrane (the inside) from the surface of the catalyst layer (the outside). In this case, the catalyst layer located inside is a catalyst layer the volume of fine pores of which is larger than that of the catalyst layers located outside; the catalyst layer located outside is a catalyst layer the volume of fine pores of which is smaller than that of the catalyst layer located inside.

In the membrane and electrode assembly of the present invention, the water holding properties of the catalyst layer can be improved without inhibiting the diffusibility of the reactant gas, and the removal of the water generated by the electrode reaction, etc. by improving the distribution of the volumes of fine pores in the thickness direction of the catalyst layer and by increasing the volume of fine pores in the thickness direction toward the polymer electrolyte membrane (the inside) from the surface of the catalyst layer (the outside). That is, ample water can be secured to produce a membrane and electrode assembly having high power generation characteristics even under low humidified conditions while preventing flooding.

In the membrane and electrode assembly of the present invention, the structure of the surface of the catalyst layer located outside is made to have a smaller and denser volume of fine pores than the structure of the catalyst layer located inside, and the structure of the catalyst layer on the polymer electrolyte membrane side located inside is made to have a more sparse structure than the structure of the catalyst layer located outside, whereby the membrane and electrode assembly is made to have both the drainage of the water generated by the electrode reaction and the water holding properties in low humidified conditions.

In the membrane and electrode assembly of the invention, a decrease in power generation characteristics due to an increase in interface resistance is not recognized differently than the application of conventional humidity controlling membranes or the handling to low humidification by formation of grooves to the surface of the catalyst layer and the polymer electrolyte membrane fuel cell comprising the inventive membrane and electrode assembly has a remarkable effect of offering high power generation characteristics even under low humidified conditions as compared with the polymer electrolyte membrane fuel cell comprising the conventional membrane and electrode assembly.

In addition, among the membrane and electrolyte assemblies, in the membrane and electrode assembly, for reference, comprising a catalyst layer of a multilayered structure including different volumes of fine pores as illustrated in FIG. 1(a), the difference between the largest and smallest values in the thickness direction of the above catalyst layer for the volumes of fine pores having a diameter of not more than 1.0 μm in terms of cylinder approximation for fine pores evaluated by the mercury intrusion method is preferably 0.1 mL/g(catalyst layer) or larger and 1.0 mL/g(catalyst layer) or smaller. When the difference of the volumes of fine pores in the thickness direction of the catalyst layer is less than 0.1 mL/g(catalyst layer), both the drainage of the water generated by the electrode reaction and the water holding properties under low humidified conditions may be difficult to satisfy at the same time. Additionally, when the difference of the volumes of fine pores exceeds 1.0 mL/g(catalyst layer) as well, both the drainage of the water generated by the electrode reaction and the water holding properties under low humidified conditions may be difficult to satisfy at the same time.

In the membrane and electrode assembly, in the assembly, for reference, comprising a catalyst layer of a two-layered structure having different volumes of fine pores as indicated in FIG. 1(a), the layer thickness of the catalyst layer 2b having a large volume of fine pores is preferably larger than the layer thickness of the catalyst layer 2a having a smaller volume of fine pores. The layer thickness of the catalyst layer 2b having a large volume of fine pores is made larger than the layer thickness of the catalyst layer 2a having a smaller volume of fine pores to thereby be able to suitably have both the drainage of water generated by the electrode reaction and water holding properties under low humidified conditions in some cases.

Moreover, among the membrane and electrolyte assemblies of the present invention, in the membrane and electrode assembly comprising the catalyst layer in which the volume of fine pores is continuously changed as shown in FIG. 1(b), the difference between the volumes of fine pores having a diameter of 1.0 μm or smaller of each catalyst layer obtained by dividing the catalyst layer into two equivalents in the thickness direction, obtained by the mercury intrusion method in terms of cylinder approximation, is preferably in the range of 0.1 mL/g(catalyst layer) or larger and 1.0 mL/g (catalyst layer) or smaller. When the difference of the volumes of fine pores of two catalyst layers when the catalyst layer is divided into two in the thickness direction is less than 0.1 mL/g(catalyst layer), both the drainage of the water generated by the electrode reaction and the water holding properties under low humidified conditions may be difficult to satisfy at the same time. Furthermore, when the difference of the volumes of fine pores exceeds 1.0 mL/g(catalyst layer) when the catalyst layer is divided into two as well, both the drainage of the water generated by the electrode reaction and the water holding properties under low humidified conditions may be difficult to satisfy at the same time.

Next, the polymer electrolyte membrane fuel cell of the invention will be described.

FIG. 2 showed an exploded schematic diagram of the inventive polymer electrolyte membrane fuel cell. In the polymer electrolyte membrane fuel cell of the invention, cathode side gas diffusion layer 4 and anode side gas diffusion layer 5 are disposed so as to face the catalyst layer 2 and the catalyst layer 3 of the membrane and electrode assembly 12. This each constitutes cathode 6 and anode 7. In addition, a pair of separators 10 made of a conductive and impermeable material comprising a gas passage 8 for gas circulation and a cooling water passage 9 for cooling water circulation in a principal plane opposing the gas passage are disposed. For example, hydrogen gas is fed as a fuel gas from the gas passage 8 of the separator 10 on the anode 7 side. On the other hand, for example, an oxygen-containing gas is fed as an oxidant gas from the gas passage 8 of the separator 10 on the cathode 6 side. As a result, an electromotive force can be generated between the anode and the cathode by causing electrode reaction between hydrogen as a fuel gas and oxygen gas in the presence of a catalyst.

Although the polymer electrolyte membrane fuel cell shown in FIG. 2 is a so-called single cell structure in which the solid polymer electrolyte membrane 1, catalyst layers 2 and 3, and gas diffusion layers 4 and 5 are sandwiched between a pair of separators, in the present invention, a plurality of cells can be laminated via the separator 10 to produce a fuel cell.

In the membrane and electrode assembly of the present invention, among the catalyst layers formed on both sides of the polymer electrolyte membrane, only one catalyst layer may be the catalyst layer in which the volume of fine pores having a diameter of 1.0 μm or smaller in terms of cylinder approximation for fine pores evaluated by the mercury intrusion method is increased toward the above polymer electrolyte membrane (the inside) from the surface of the catalyst layer (the outside). At this time, in the polymer electrolyte membrane fuel cell of the present invention, the catalyst layer the volume of fine pores of which is increased toward the above polymer electrolyte membrane, which is on the inside, from the surface of the catalyst layer, which is on the outside, is disposed on the cathode in which water is generated by electrode reaction.

Next, a first method of producing the membrane and electrode assembly for reference will be set forth.

The first method of producing the membrane and electrode assembly for reference can readily produce, by steps (1) to (3) below, a membrane and electrode assembly comprising a catalyst layer in which the volume of fine pores having a diameter of 1.0 μm or smaller in terms of cylinder approximation for fine pores evaluated by the mercury intrusion method is increased toward the above polymer electrolyte membrane (the inside) from the surface of the catalyst layer (the outside).

Step (1) is a step of producing a catalyst ink made by dispersing particles carrying a catalyst material and a polymer electrolyte in a solvent, the above volumes of fine pores formed in the catalyst layers being different from each other.

Step (2) is a step of applying catalyst inks in the order of increasing the above volume of fine pores formed in the catalyst layer, or applying catalyst inks in the order of decreasing the above volume of fine pores formed in the catalyst layer, onto a substrate selected from a gas diffusion layer, transfer sheet and polymer electrolyte membrane, to thereby form, on the above substrate, a multilayered catalyst layer in which the volumes of fine pores are sequentially changed.

Step (3) is a step of joining the catalyst layer formed on the above substrate to both sides of the polymer electrolyte membrane when the above substrate is a gas diffusion layer or transfer sheet.

The first method of producing the membrane and electrode assembly when a gas diffusion layer or a transfer sheet is used as a substrate will be described. An explanatory view of the first method of producing the membrane and electrode assembly for reference is shown in FIG. 3.

In the first method of producing the membrane and electrode assembly, step (1) is a step of producing catalyst inks 2a", 2b", 3a" and 3b" for forming different volumes of fine pores, the catalyst ink being produced by dispersing particles carrying a catalyst material and a polymer electrolyte in a solvent (FIG. 3(a)).

The catalyst ink is prepared by dispersing particles carrying a catalyst material and a polymer electrolyte in a solvent. Catalyst inks 2a" and 3a" for forming a catalyst layer having a small volume of fine pores and catalyst inks 2b" and 3b" for forming a catalyst layer having a large volume of fine pores are produced (FIG. 3(a)).

At least two kinds of catalyst inks for forming catalyst layers having different pore volumes can be made by changing the amount of polymer electrolyte to the particles that carry a catalyst in a catalyst ink, by using a dispersing agent, or by changing the method of distributing a catalyst ink. The amount of polymer electrolyte to the amount of particles carrying a catalyst in a catalyst ink is made increased to thereby be able to make small the volume of fine pores. On the other hand, the amount of particles carrying a catalyst is made large to thereby be able to make large the volume of fine pores of a catalyst layer to be formed. Moreover, the addition of a dispersing agent to a catalyst ink enables the volume of fine pores of a catalyst layer to be formed to be small. Furthermore, the dispersion state of a catalyst ink is made changed to thereby be able to produce a catalyst ink for changing the volume of fine pores. For example, with increasing dispersion time, the aggregate of particles carrying a catalyst material is broken, so that the volume of fine pores of a catalyst layer to be formed can be made small.

In the first method of producing the membrane and electrode assembly, step (2) is a step of forming a catalyst layer of a multilayered structure in which the volume of fine pores is sequentially changed on a substrate by applying a catalyst ink for forming a catalyst layer having a large volume of fine pores to a catalyst ink for forming a catalyst layer having a small volume of fine pores in this order onto the above substrate (FIGS. 3(b) to 3(f)).

The catalyst inks 2a" and 3a" for forming a catalyst layer having a small volume of fine pores are applied onto a substrate 22 to form coating films 2a' and 3a' on the substrate 22 (FIGS. 3(b) and 3(c)). Next, a drying step is optionally provided, the solvent in the coating films is removed, and catalyst layers 2a and 3a having a small volume of fine pores are formed on the substrate 22. Then, the catalyst inks 2b" and 3b" for forming a catalyst layer having a large volume of fine pores are applied onto the catalyst layers 2a and 3a having a small volume of fine pores (FIG. 3(d)) to form coating films 2b' and 3b' on the catalyst layers 2a and 3a having a small volume of fine pores (FIG. 3(e)). Now, the solvent in the coating films is removed by the drying step, and a pair of the substrates of a substrate sequentially comprising the catalyst layer 2a having a small volume of fine pores and the catalyst layer 2b having a large volume of fine pores from the substrate 22 side and a substrate sequentially comprising the catalyst layer 3a having a small volume of fine pores and the catalyst layer 3b having a large volume of fine pores from the substrate 22 side are formed.

At this time, a gas diffusion layer or a transfer sheet is used as the substrate. A catalyst ink for forming a catalyst layer having a small volume of fine pores and a catalyst ink for forming a catalyst layer having a large volume of fine pores are coated in order from the substrate side. For forming a catalyst layer as a multilayered structure, a catalyst layer having a small volume of fine pores and a catalyst layer having a large volume of fine pores are formed, in order from the substrate side, on a gas diffusion layer or transfer sheet as a substrate, whereby in the next step (step (3)), a membrane and electrode assembly comprising the catalyst layer can be fabricated in which the volume of fine pores is increased toward the above polymer electrolyte membrane (the inside) from the surface of the catalyst layer (the outside).

When a catalyst layer having two or more layers is formed, a drying step of removing a solvent within the coating film is disposed as required.

At this time, a catalyst ink for a first layer is applied onto the substrate to form a coating film and then the coating film is dried to form a catalyst layer for a first layer, and a catalyst ink for a second layer is applied onto the catalyst layer for the first layer and then the coating film is dried to form a catalyst layer for a second layer to thereby form a catalyst layer having a multilayered structure.

It is also possible that a catalyst ink for a first layer is applied to form a coating film and a drying step is not carried out and subsequently a catalyst ink for a second layer is applied to form a coating film and these coating films are dried to thereby form a catalyst layer having a multilayered structure.

It is possible as well that a catalyst ink for a first layer is applied to form a coating film and the coating film is dried and part of the solvent is left within the coating film to make semi-dry conditions and then a catalyst ink for a second layer is applied to form a coating film and these coating films are dried to form a catalyst layer having a multilayered structure.

In the first method of producing the membrane and electrode assembly, a dry step of drying a coating film can be optionally changed.

In the first method of producing the membrane and electrode assembly, step (3) is a step of joining the above catalyst layer formed on the above substrate to the above polymer electrolyte membrane (FIG. 3(e)). At this time, the joining method can use hot press (hot pressing). When a transfer sheet is used as the substrate, the substrate is peeled after transfer by hot press, or when a gas diffusion layer is used as the substrate, the substrate is not peeled.

The first method of producing the membrane and electrode assembly as described above can produce the membrane and electrode assembly for reference, the assembly comprising a catalyst layer in which the volume of fine pores having a diameter of 1.0 μm or smaller in terms of cylinder approximation for fine pores evaluated by the mercury intrusion method is increased toward the above polymer electrolyte membrane (the inside) from the surface of the catalyst layer (the outside).

In addition, in the first method of producing the membrane and electrode assembly, assuming that catalyst inks forming different volumes of fine pores are the same kind of catalyst inks, the first method of forming the catalyst layer and the second method of forming the catalyst layer are changed, whereby a catalyst layer of a multi-layered structure having different volumes of fine pores can be formed on a substrate. For example, the drying conditions of a coating film after applying a catalyst ink onto a substrate are changed to thereby be able to form a catalyst layer having different volumes of fine pores.

Specifically, a step of drying a coating film after firstly applying a catalyst ink onto a substrate and a step of drying a coating film after secondly applying a catalyst ink onto the substrate are changed, thereby being capable of forming a catalyst layer having different volumes of fine pores. The evaporation rate of the solvent in the coating film in the drying step is changed to thereby be able to form a catalyst layer having different volumes of fine pores. The evaporation rate of a solvent in the coating film is made large to thereby be able to form a catalyst layer having a larger volume of fine pores; the evaporation rate of a solvent in the coating film is made small to thereby be able to form a catalyst layer having a smaller volume of fine pores. The drying temperature is made high to be able to increase the evaporation rate of the solvent in the coating film in the drying step; the drying temperature is made low to be able to decrease the evaporation rate of the solvent in the coating film in the drying step.

In addition, the first method of producing the membrane and electrode assembly can also use a polymer electrolyte membrane as the substrate and directly apply a catalyst ink to both sides of the polymer electrolyte membrane to form the membrane and electrode assembly. In this case, the catalyst ink for forming a catalyst layer having a large volume of fine pores and the catalyst ink for forming a catalyst layer having a small volume of fine pores are sequentially applied to the polymer electrolyte membrane to thereby form the catalyst layer. This can produce the membrane and electrode assembly for reference, the assembly comprising a catalyst layer in which the volume of fine pores having a diameter of 1.0 μm or smaller in terms of cylinder approximation for fine pores evaluated by the mercury intrusion method is increased toward the above polymer electrolyte membrane (the inside) from the surface of the catalyst layer (the outside).

In addition, it is also possible that the first method of producing the membrane and electrode assembly includes forming a catalyst layer of a multilayered structure on a transfer sheet by use of the transfer sheet as the substrate, transferring the catalyst layer on the transfer sheet onto a gas diffusion layer once and then joining the catalyst layer on the gas diffusion layer to the polymer electrolyte membrane to thereby form the membrane and electrode assembly.

In this case, in the catalyst layer formed on the substrate, which is a transfer sheet, the catalyst layer having a large volume of fine pores and the catalyst layer having a small volume of fine pores are sequentially formed in order from the substrate side toward the surface of the catalyst layer.

Next, a first method of producing the membrane and electrode assembly of the present invention will be set forth.

The first method of producing the membrane and electrode assembly of the present invention can readily produce, by steps (1) to (3) below, a membrane and electrode assembly comprising a catalyst layer in which the volume of fine pores having a diameter of 1.0 μm or smaller in terms of cylinder approximation for fine pores evaluated by the mercury intrusion method is increased toward the above polymer electrolyte membrane (the inside) from the surface of the catalyst layer (the outside).

Step (1) is a step of dispersing particles carrying a catalyst material and a polymer electrolyte in a solvent to produce a catalyst ink.

Step (2) is a step of applying the above catalyst ink onto a substrate selected from a gas diffusion layer and a transfer sheet to form a coating film, drying the coating film to remove the solvent in the coating film and to form a catalyst layer, a step of giving a temperature to the opposite side of the substrate of the coating film higher than a temperature to the face of the coating film on the substrate side in the thickness direction of the coating film when the coating film formed on the substrate is dried to remove the solvent.

Step (3) is a step of joining the catalyst layer formed on the above substrate to the above polymer electrolyte membrane.

An explanatory view of the first method of producing the membrane and electrode assembly of the invention is shown in FIG. 4.

In the second method of manufacturing the membrane and electrode assembly of the invention, step (1) is a step for producing a catalyst ink obtained by dispersing particles carrying a catalyst material and a polymer electrolyte in a solvent (FIG. 4(a)). Catalyst inks 2" and 3" are prepared by dispersing particles carrying a catalyst material and a polymer electrolyte in a solvent.

In the second method of producing the membrane and electrode assembly, step (2) is a step for applying the above catalyst ink onto the substrate to form a coating film, drying the coating film and removing the solvent within the coating film to form a catalyst layer, and also a step for giving a temperature to the opposite face of the coating film of the substrate higher than a temperature to the face of the coating film of the substrate in the thickness direction of the coating film when the coating film formed on the substrate is dried and the solvent is removed (FIGS. 4(b) and 4(c)).

The catalyst inks 2" and 3" containing particles carrying a catalyst material, a polymer electrolyte and a solvent are applied to the substrate (FIG. 4(b)). Then, coating films 2' and 3' on the substrate are placed over a cooling stage 23 equipped with a cooling mechanism 24 and the entire material including the cooling stage 23 is dried within an oven 25 to give a temperature difference to the coating film comprising the catalyst inks in the thickness direction (FIG. 4(c)). The coating films 2' and 3' are given a temperature higher on the side opposite to the substrate than on the substrate side.

In the present invention, the solvent is removed and a catalyst layer is formed while a temperature difference is given to the coating film formed on the substrate in the thickness direction, whereby the volume of fine pores of the catalyst layer in the thickness direction is changed. Specifically, a catalyst layer in which the volume of fine pores is increased toward the surface of the catalyst layer opposite to the substrate can be formed.

Although this cause is not apparent, the inclusion percentage of the polymer electrolyte of a catalyst layer to be formed is changed by making slow the evaporation rate of a solvent in the coating film on the substrate side as compared with the surface of the coating film (opposite to the substrate), so that a catalyst layer is thought to be formed in which the volume of fine pores is continuously increased toward the surface from the substrate side.

At this time, a transfer sheet or a gas diffusion layer can be used as the substrate. A catalyst layer in which the volume of fine pores is increased from the surface side opposite to the substrate toward the substrate side is formed on the substrate, whereby in the next step (step (3)), a membrane and electrode assembly can be produced in which the pore volume is increased toward the above polymer electrolyte membrane (the inside) from the surface of the catalyst layer (the outside).

Additionally, the method of drying a coating film while giving a temperature difference in the thickness direction to the coating film to be formed on the substrate is not limited to the case in FIG. 3(c), and for example, a method can be used that involves placing a substrate on which a coating film has been formed over a cooling stag, applying warm air to the coating film surface to dry while giving a temperature difference in the thickness direction. Moreover, the cooling mechanism 24 of the cooling stage 23 can use, but is not limited to, a mechanism in which a cooling medium is passed in the stage by piping.

In the first method of producing the membrane and electrode assembly of the invention, step (3) is a step of joining the above catalyst layer formed on the above substrate to the above polymer electrolyte membrane (FIG. 3(e)). At this time, the joining method can use hot press (hot pressing). When a transfer sheet is used as the substrate, the substrate is peeled after joining by hot press. Further, when a gas diffusion layer is used as the substrate, the substrate is not peeled.

In the first method of manufacturing the membrane and electrode assembly of the invention, in drying of the coating film in step (2), the temperature given to the surface opposite to the substrate of the coating film is preferably [(temperature given to substrate side)+5° C.] or higher and 150° C. or lower.

When the temperature given to the surface opposite to the substrate of the coating film is below [(temperature given to the substrate side)+5° C.], the difference of the volume of fine pores of the catalyst layers formed is not generated and the volume of fine pores of the catalyst layers formed tends to be uniform, whereby the advantage of the invention is not sufficiently obtained. In addition, when the temperature given to the surface opposite to the substrate of the coating film exceeds 150° C., the drying nonuniformity of the catalyst layers is unsuitably generated and the effect of heat treatment given to the polymer electrolyte membrane is unsuitably large.

Moreover, if the temperature given to the coating film of the substrate side is lowered, the evaporation rate of the solvent is small and the catalyst layer having a finer pore volume is formed, so that water holding properties under low humidified conditions can be improved. The temperature given to the coating film of the substrate side is preferably 0° C. or higher from the viewpoint of easy temperature control. Furthermore, the temperatures given to the substrate side of the coating film and to the side opposite to the substrate are preferably below the boiling point of the solvent. When the temperature given to the coating film is higher than the boiling point of the solvent, the evaporation rate remarkably becomes large, the catalyst layer in which the volume of fine pores in the thickness direction is changed may not be formed.

In the first method of producing the membrane and electrode assembly of the invention as well, also when a catalyst ink is applied onto a substrate to be coated, the cooling stage is preferably used. The removal of the solvent within the coating film of the catalyst ink is initiated immediately after the application of the catalyst ink onto the substrate and also when the catalyst ink is applied onto the substrate to be coated, the cooling stage is preferably used.

The first method of producing the membrane and electrode assembly of the invention as described above can produce the membrane and electrode assembly of the present invention, the assembly comprising a catalyst layer in which the volume of fine pores having a diameter of 1.0 μm or smaller in terms of cylinder approximation for fine pores evaluated by the mercury intrusion method is increased toward the above polymer electrolyte membrane (the inside) from the surface of the catalyst layer (the outside).

In addition, the membrane and electrode assembly can also be produced by a method other than the first manufacturing method for reference and the first manufacturing method of the invention. Additionally, a combination of the first manufacturing method for reference and the first manufacturing method of the invention may form the catalyst layer and may also produce the membrane and electrode assembly.

The membrane and electrode assembly and the polymer electrolyte membrane fuel cell of the invention will be set forth in more detail.

The polymer electrolyte membrane used for the membrane and electrode assembly and the fuel cell of the invention suitably have proton conductivity and can use fluorine polymer electrolytes and hydrocarbon polymer electrolytes. As a fluorine polymer electrolyte is used, for example, Nafion® available from Du Pont Corp., Flemion® available from Asahi Glass Co., Ltd., Aciplex® available from Asahi Kasei Corporation, Gore Select® available from Gore Corp. or the like. Hydrocarbon polymer electrolyte membranes that can be used include electrolyte membranes such as sulfonated polyether ketone, sulfonated polyethersulfone, sulfonated polyether ether sulfone, sulfonated polysulfide, sulfonated polyphenylene. In particular, Nafion® material available from Du Pont Corp. can be suitably used as the polymer electrolyte membrane. Hydrocarbon polymer electrolyte membranes that can be used include electrolyte membranes such as sulfonated polyether ketone, sulfonated polyethersulfone, sulfonated polyether ether sulfone, sulfonated polysulfide and sulfonated polyphenylene.

In the inventive membrane and electrode assembly, the catalyst layers formed on both sides of the polymer electrolyte membrane are formed on both sides of the polymer electrolyte membrane using a catalyst ink. The catalyst ink includes at least a polymer electrolyte and a solvent.

The polymer electrolyte contained in the inventive catalyst ink may suitably exhibit proton conductivity, and materials similar to the polymer electrolyte membrane can be used. Fluorine polymer electrolytes and hydrocarbon polymer electrolytes can be used. The fluorine polymer electrolytes that can be used include, for example, Nafion® materials available from Du Pont Corp. Hydrocarbon polymer electrolyte membranes that can be used also include electrolyte membranes such as sulfonated polyether ketone, sulfonated polyethersulfone, sulfonated polyether ether sulfone, sulfonated polysulfide and sulfonated polyphenylene. In particular, Nafion® material available from Du Pont Corp. can be suitably used as the polymer electrolyte membrane. In addition, in consideration of adhesion properties of the catalyst layer and the polymer electrolyte membrane, materials equivalent to the polymer electrolyte membranes are preferably used.

The catalyst materials that can be used in the invention (hereinafter, may be called catalyst particles or catalysts) include, in addition to the platinum group elements such as platinum and palladium, ruthenium, iridium, rhodium and osmium, metals such as iron, lead, copper, chromium, cobalt, nickel, manganese, vanadium, molybdenum, gallium and aluminum, alloys thereof, or oxides, complex oxides, and the like.

Additionally, when the particle diameters of these catalysts are too large, the activity of the catalysts decreases, and when the diameter is too small, the stability is decreased, so it is preferably from 0.5 to 20 nm. More preferably, the diameter may be from 1 to 5 nm.

When the catalyst particles are one or two or more metals selected from platinum, gold, palladium, rhodium, ruthenium and iridium, the electrode reaction is excellent and efficiently carried out and the polymer electrolyte membrane fuel cell comprising the catalyst layer of the invention exhibits high power generation characteristics, whereby they are preferably used in the invention.

The electron conductive powders carrying these catalysts generally make use of carbon particles. Any kinds of carbon particles are acceptable so long as they are particulate, exhibit conductivity and are not attacked by the catalyst, and the carbon particles that can be used include carbon black, graphite, black lead, activated charcoal, carbon fiber, carbon nanotube and fullerene.

If the particle diameter of the carbon particle is too small, the electron conductive path is hardly formed and if the diameter is too large, the gas diffusibility of the catalyst layer is decreased or the utilization factor of the catalyst is lowered, so that the particle diameter is preferably about 10 to about 1,000 nm. The diameter is more preferably from 10 to 100 nm.

The solvent used as a dispersing medium of the catalyst ink is not particularly limited so long as the solvent does not erode the catalyst particles and the polymer electrolyte and dissolves the polymer electrolyte in a high flowability state or disperses the polymer electrolyte as a fine gel.

However, a volatile organic solvent is desirably at least contained and the examples that are used include, but are not limited to, alcohols such as methanol, ethanol, 1-propanol, 2-propanol, 1-butanol, 2-butanol, isobutylalcohol, tert-butylalcohol and pentanol, ketones such as acetone, methyl ethyl ketone, pentanone, methyl isobutyl ketone, heptanone, cycrohexanone, methylcyclohexanone, acetonylacetone and di-isobutyl ketone, ethers such as tetrahydrofuran, dioxane, diethylene glycol dimethyl ether, anisole, methoxytoluene and dibutyl ether, and in addition polar solvents such as dimethylformamide, dimethylacetamide, N-methylpyrrolidone, ethylene glycol, diethylene glycol, diacetone alcohol, 1-methoxy-2-propanol, and the like. Moreover, a mixture of two or more solvents of these can be used.

In addition, the use of a lower alcohol as a solvent increases the risk of ignition, so a mixed solvent with water may be preferably selected when such solvent is used. The solvent may also contain water compatible with polymer electrolytes. The amount of addition of water is not particularly limited so long as the polymer electrolyte dissociates and generates cloudiness or is gelated.

Since the volume of fine pores of the catalyst layer depends on the composition and dispersion conditions of the catalyst ink, and varies depending on the amount of polymer electrolyte, the kind of dispersion solvent, the dispersive technique, and the dispersion time, etc., the volume of fine pores is preferably controlled and formed by use of at least one, preferably a combination of two or more of these so that the volume of fine pores of the catalyst layer is increased toward the polymer electrolyte membrane from the vicinity of the gas diffusion layer.

The catalyst ink may include a dispersing agent in order to disperse carbon particles carrying a catalyst material. The dispersing agents can include anionic surfactants, cationic surfactants, ampholytic surfactants, nonionic surfactants, and the like.

The above anionic surfactants include, specifically, for example, carboxylic acid-type surfactants such as alkyl ether carboxylate salts, ether carboxylate salts, alkanoyl sarcosine, alkanoyl glutamate salts, acyl glutamate, oleic acid/N-methylic taurine, potassium oleate/diethanolamine salts, alkyl ether sulfate/triethanolamine salts, polyoxyethylene alkyl ether sulfate/triethanolamine salts, amine salts of specifically modified polyether-ester acids, amine salts of higher fatty acid derivatives, amine salts of specifically modified polyester acids, amine salts of high molecular weight polyether ester acids, amine salts of specifically modified phosphate esters, high-molecular weight polyester acid amide amine salts, specific fatty acid derivative amide amine salts, alkylamine salts of higher fatty acids, amide amine salts of high molecular weight polycarboxylic acids, sodium laurate, sodium stearate and sodium oleate; sulfonic acid-type surfactants such as dialkyl sulfosuccinate, sulfosuccinic acid dialkyl salts, 1,2-bis (alkoxycarbonyl)-1-ethane sulfonic acid salts, alkyl sulfonates, alkyl sulfonate salts, paraffine sulfonate salts, alpha olefin sulfonate, linear alkylbenzene sulfonates, alkylbenzene sulfonates, polynaphthyl methanesulfonates, polynaphthylmethane sulfonate salts, naphthalenesulfonate formalin condensation products, alkylnaphthalene sulfonates, alkanoylmethyl taurides, sodium lauryl sulfate ester, sodium cetyl sulfate ester, sodium stearyl sulfate ester, sodium oleyl sulfate ester, lauryl ether sulfate ester salts, sodium alkylbenzene sulfonate, oil-soluble alkylbenzenesulfonate salts and α-olefin sulfonate salts; sulfate ester-type surfactants such as alkyl sulfate ester salts, alkyl sulfate salts, alkyl sulfate, alkyl ether sulfate, polyoxyethylene alkyl ether sulfate, alkylpolyethoxy sulfate salts, polyglycol ether sulfate, alkyl polyoxyethylene sulfate salts, sulfated oil and advanced sulfated oil; and phosphate ester-type surfactants such as alkyl phosphate (mono or di) salts, (mono or di)alkyl phosphate, (mono or di)alkyl phosphate ester salts, alkyl phosphate polyoxyethylene salts, alkyl ether phosphates, alkylpoly ethoxy/phosphate salts, polyoxyethylene alkyl ethers, alkylphenyl phosphate/polyoxyethylene salts, alkyl phenyl/ether phosphates, alkyl phenyl/polyethoxy/phosphates, polyoxyethylene/alkylphenyl/ether phosphates, higher alcohol phosphate monoester disodium salts, higher alcohol phosphate diester disodium salt, and zinc dialkylphosphorodithioates.

The above cationic surfactants include, specifically for example, benzyldimethyl{2-[2-(P-1,1,3,3-tetramethylbutylphenoxy)ethoxy]ethyl} ammonium chloride, octadecylamine acetate salts, tetradecylamine acetate salts, octadecyl trimethylammonium chloride, beef tallow trimethylammonium chloride, dodecyl trimethylammonium chloride, coconut trimethylammonium chloride, hexadecyltrimethylammonium chloride, behenyltrimethylammonium chloride, coco dimethyl benzyl ammonium chloride, tetradecyldimethylbenzylammonium chloride, octadecyldimethylbenzylammonium chloride, dioleyldimethylammonium chloride, 1-hydroxyethyl-2-beef tallow imidazoline quarternary salts, 2-heptadecenylhydroxyethyl imidazoline, stearamide ethyldiethylamine acetate salts, stearamide ethyldiethylamine hydrochloride, triethanolaminemonostearate formate salts, alkylpyridinium salts, higher alkyl amine ethylene oxide addition products, polyacrylamide amine salts, modified polyacrylamide amine salts, and perfluoroalkyl quaternary ammonium iodide.

The above ampholytic surfactants include, specifically for example, dimethyl palm betaine, dimethyl lauryl betaine, sodium lauryl aminoethyl glycine, sodium lauryl aminopropionate, stearyl dimethyl betaine, lauryl dihydroxyethyl betaine, amide betaines, imidazolinium betaine, lecithins, sodium 3-[ω-fluoroalkanoyl-N-ethylamino]-1-propanesulfonate, and N-[3-(perfluorooctanesulfoneamide)propyl]-N,N-dimethyl-N-carboxymethylene ammonium betaine.

The above nonionic surfactants include, specifically for example, coconut fatty acid diethanolamide (1:2 type), coconut fatty acid diethanolamide (1:1 type), beef tallow acid diethanolamide (1:2 type), beef tallow acid diethanolamide (1:1 type), diethanolamide oleate (1:1 type), hydroxyethyl laurylamine, polyethylene glycol lauryl amine, polyethylene glycol cocoamine, polyethylene glycol stearylamine, polyethylene glycol beef tallow amines, polyethylene glycol beef tallow propylenediamines, polyethylene glycol dioleylamine, dimethyl laurylamine oxide, dimethyl stearylamine oxide, dihydroxyethyl laurylamine oxide, perfluoroalkylamine oxides, polyvinylpyrrolidones, higher alcohol ethylene oxide addition products, alkylphenylethylene oxide addition products, fatty acid ethylene oxide addition products, polypropylene glycol ethylene oxide addition products, fatty acid esters of glycerin, fatty acid esters of pentaerythrite, fatty acid esters of sorbit, fatty acid esters of sorbitan, fatty acid esters of sugar, and the like.

Among the above surfactants, sulfonic acid type surfactants such as alkylbenzene sulfonic acids, oil-soluble alkylbenzene sulfonic acids, $\alpha$-olefin sulfonic acids, sodium alkylbenzene sulfonates, oil-soluble alkylbenzenesulfonate salts, and $\alpha$-olefin sulfonate salts are suitable in consideration of the diffusion effect of carbon, changes in catalyst performance due to the remaining of a dispersing agent, etc.

The pore volume is generally small when the amount of polymer electrolyte in the catalyst ink is large. On the other hand, the volume of fine pores can be enlarged by making the number of carbon particles large. Moreover, the pore volume can be decreased when a dispersing agent is used.

Distributed processing is optionally carried out on the catalyst ink. The viscosity of the catalyst ink and the size of the particles can be controlled according to the conditions of distributed processing of the catalyst ink. Distributed processing can be conducted using various devices. Examples of distributed processing include processing by ball mills and roll mills, processing by shearing mills, processing by wet mills, ultrasonic dispersion processing, and other processing. In addition, homogenizers that perform agitation by centrifugal force and the like may be used.

With increasing dispersion time, the aggregate of particles carrying a catalyst material is broken, so that the volume of fine pores becomes small.

When the content of solid matter in the catalyst ink is too large, cracks are likely generated on the surface of the catalyst layer due to an increase in viscosity of the catalyst ink; on the other hand, if it is too small, the film formation rate is very slow and the productivity is lowered, whereby the content is preferably from 1 to 50% by mass.

The solid matter includes carbon particles carrying a catalyst material (hereinafter, called a catalyst-carrying carbon) and a polymer electrolyte, and if the content of catalyst-carrying carbon is made large, the viscosity is increased even in the case of the same solid matter content, and if the catalyst-carrying carbon content is made small, the viscosity is decreased.

Because of this, the proportion of the catalyst-carrying carbon in the solid matter is preferably 10-80% by mass. Additionally, the viscosity of the catalyst ink in this case is preferably from about 0.1 to about 500 cP, more preferably from 5 to 100 cP. Moreover, the addition of a dispersing agent during catalyst ink dispersion enables the viscosity to be controlled.

In addition, a pore-forming agent may also be included in the catalyst ink.

The pore-forming agent is removed after the formation of a catalyst layer, thereby being capable of forming fine pores.

The pore-forming agents include acids or alkalis, materials soluble in water, materials that sublime such as camphor, materials subjected to pyrolysis, and the like. If the material is soluble in warm water, it may be removed by the water generated during power generation.

The pore-forming agents that are soluble in acids and alkalis and water include acid-soluble inorganic salts such as calcium carbonate, barium carbonate, magnesium carbonate, magnesium sulfate and magnesium oxide; inorganic salts that are soluble in aqueous alkaline solutions such as alumina, silica gels and silica sols; metals that are soluble in acids or alkalis such as aluminum, zinc, tin, nickel and iron; water-soluble inorganic salts such as sodium chloride, potassium chloride, ammonium chloride, sodium carbonate, sodium sulfate and monosodium phosphate; water-soluble organic compounds such as polyvinyl alcohols and polyethylene glycol; and the like. These can also be effectively used in combination of two or more species.

The catalyst ink is applied onto a substrate and forms a catalyst layer through the drying step. When a gas diffusion layer or transfer sheet is used as the substrate, the catalyst layer is joined on both sides of the polymer electrolyte membrane by a joining step. Further, in the membrane and electrode assembly of the invention, a polymer electrolyte membrane is used as the substrate and a catalyst ink is directly applied onto both sides of the polymer electrolyte membrane to thereby be able to directly form a catalyst layer on both sides of the polymer electrolyte membrane.

At this time, the application methods that are usable include a doctor blade method, dipping method, screen printing method, roll coating method, spraying method, and the like. For example, a spraying method such as a pressure-spraying method, ultrasonic spraying method, or electrostatic spraying method hardly causes the agglomeration of the catalyst-carrying carbon when the coated catalyst ink is dried, thereby being capable of obtaining a homogeneous catalyst layer with high porosity.

A gas diffusion layer, a transfer sheet or a polymer electrolyte membrane can be used as a substrate in the method of manufacturing the membrane and electrode assembly of the present invention.

The transfer sheet used as the substrate is acceptable when having good transcription and the examples include fluorine-based resins such as ethylene tetrafluoroethylene copolymer (ETFE), tetrafluoroethylene-hexafluoropropylene copolymer (FEP), tetrafluoro perfluoroalkylvinyl ether copolymer (PFA) and polytetrafluoroethylene (PTFE). In addition, polymer sheets and polymer films of polyimide, polyethylene terephthalate, polyamide (nylon), polysulfones, polyether sulphones, polyphenylene sulfides, polyether/ether ketones, polyether imides, polyarylates and polyethylene naphthalates, and the like can be used as the transfer sheets. When the transfer sheet is used as the substrate, the catalyst layer is joined to the polymer electrolyte membrane and then the transfer sheet is peeled to thereby form a membrane and electrode assembly (MEA) comprising the catalyst layer on both sides of the polymer electrolyte membrane.

Additionally, the gas diffusion layer can utilize a material having gas diffusibility and conductivity. Specifically, the gas diffusion layer can use porous carbon materials such as carbon cloth, carbon paper and nonwoven fabric. The gas diffusion layer can also be used as the substrate. In this case, the substrate, which is the gas diffusion layer, does not need to be peeled after the joining step.

Moreover, when the gas diffusion layer is used as the substrate, before a catalyst ink is applied, a filling layer may be formed in advance on the gas diffusion layer. The filling layer prevents the catalyst ink from soaking into the gas diffusion layer, and the catalyst ink deposits on the filling layer to form a three-phase interface even when the amount of coating of the catalyst ink is small. Such a filling layer can be formed, for example, by dispersing carbon particles in a fluorine-based resin solution and sintering the resulting solution at a temperature higher than the melting point of the fluorine-based resin. Polytetrafluoroethylene (PTFE) or the like can be utilized as the fluorine-based resin.

In addition, a carbon type, metal type, or the like can be used as the separator. Additionally, the gas diffusion layer and the separator may become an integral structure. Moreover, when the separator or the catalyst layer has the function of the gas diffusion layer, the gas diffusion layer may be omitted. Furthermore, the fuel cell can be produced by assembling other attendant equipment such as a gas supply device and a cooling device.

EXAMPLES

The membrane and electrode assembly and its manufacturing method in the present invention will be set forth below by way of specific Examples and Comparative Examples; however, the invention is by no means limited by Examples described below.

Reference Example 1 and Comparative Example 1 will be described.

Reference Example 1

Preparation of Catalyst Ink

Platinum loaded carbon catalyst in which 50 wt % of platinum is included (product trade name: TEC10E50E, made by Tanaka Kikinzoku Kogyo K. K.) and 20 wt % of polymer electrolyte solution (Nafion® by DuPont) were mixed in a solvent and a dispersing treatment was performed by a planetary ball mill (product name: Pulverisette 7, made by FRITSCH GmbH). A catalyst ink made by setting a dispersion time of 30 minutes was represented by catalyst ink 1A.

A catalyst ink made by setting a dispersion time of 2 hours was represented by catalyst ink 1B. The pot and the ball of the ball mill used was made from zirconia.

The composition ratio of the starting materials of platinum-carrying carbon to a polymer electrolyte (Nafion®, made by Du Pont Corp.) was 2:1 in the mass ratio, and the ratio of the dispersion solvent of 1-propanol to 2-propanol was 1:1 in the volume ratio. Moreover, the content of solid matter was set to be 10% by mass.
[Substrate]

A polytetrafluoroethylene (PTFE) sheet was used as the transfer sheet.
[Method of Forming a Catalyst Layer onto the Substrate]

Catalyst ink 1B was applied onto the substrate with a doctor blade and the coating was dried for 5 minutes. Then, catalyst ink 1A was similarly applied thereonto, and the coating was dried at 90° C. for 30 minutes in the atmosphere to produce a catalyst layer having a two-layer structure.

The amounts of application of catalyst inks 1A and 1B per unit area were made in a ratio of 5:1 in terms of mass. The thickness of the catalyst layer was adjusted in such a way that 0.3 mg/cm$^2$ of platinum was loaded in the electrode catalyst layer.

The fine pores in the catalyst layer made from each catalyst ink were measured by a mercury porosimeter (Brand name: Pascal 140/240, made by ThermoQuest Corp.).

As a result, the volume of fine pores of the catalyst layer formed using catalyst ink 1B was decreased as compared with the volume of fine pores of the catalyst layer formed using catalyst ink 1A, and its difference was 0.25 mL/g-(catalyst layer).

Comparative Example 1

Preparation of Catalyst Ink

Catalyst ink 1A described in Reference Example 1 was used.
[Substrate]

A substrate similar to that in Reference Example 1 was used.
[Method of Fabricating a Catalyst Layer]

Catalyst ink 1A was applied onto the substrate with a doctor blade and the coating was dried for 5 minutes. Then, the same catalyst ink 1A was applied thereonto again, and the coating was dried at 90° C. for 30 minutes in the atmosphere to produce a catalyst layer.

The ratio of the amounts of application of the first and second coatings was 5:1 in mass. The thickness of the catalyst layer was adjusted in such a way that 0.3 mg/cm$^2$ of platinum was loaded in the electrode catalyst layer.

The fine pores in each of the catalyst layers made from catalyst ink 1 were measured as in Reference Example 1 by a mercury porosimeter (Brand name: Pascal 140/240, made by ThermoQuest Corp.).

As a result, the volume of fine pores of the catalyst layer made using catalyst ink 1A was the same as the volume of fine pores of the catalyst layer made using catalyst ink 1 in Reference Example 1.
(Fabrication of a Membrane and Electrode Assembly (MEA))

The substrates having formed thereon the catalyst layers produced in Reference Example 1 and Comparative Example 1 were each stamped into a square of 25 cm$^2$, and the transfer sheets were disposed so as to face both sides of the polymer electrolyte membrane (Nafion®, made by Du Pont Corp.) and the resulting laminate was subjected to hot press at 130° C. and 6.0×10$^6$ Pa to obtain a membrane and electrode assembly (MEA) illustrated in FIG. 1.
(Evaluation)
[Power Generation Characteristics]

Carbon cloths as gas diffusion layers were affixed to the membrane and electrolyte assemblies of Reference Example 1 and Comparative Example 1 so as to sandwich and the resulting material was placed within a power generation evaluation cell (made by NF Corp.). This material was subjected to current voltage measurement at a cell temperature of 80° C. under two operating conditions noted below using a fuel cell measuring device (Brand name: GFT-SG1, made by Toyo Technica Inc.). The flow rate was controlled to make the utilization factor constant using hydrogen as the fuel gas and air as the oxidant gas. In addition, the back pressure was set at 100 kPa.

Full humidification: Anode 100% RH and cathode 100% RH

Low humidification: Anode 20% RH cathode 20% RH
(Measurement Results)

The power generation characteristics of the membrane and electrolyte assemblies (MEA) produced in Reference Example 1 and Comparative Example 1 are illustrated in FIG. 5.

In FIG. 5, the bold solid line (Reference Example 1) indicates a power generation characteristic in low humidification of the membrane and electrode assembly and the bold dotted line (Reference Example 1) indicates a power generation characteristic in full humidification of the membrane and electrode assembly. On the other hand, in FIG. 8, the thin solid line shows a power generation characteristic in low humidification of the membrane and electrode assembly of Comparative Example 1, and the thin dotted line shows a power generation characteristic in full humidification of the membrane and electrode assembly of Comparative Example 1.

The results of the power generation characteristics of the membrane and electrolyte assemblies of Reference Example 1 and Comparative Example 1 have ascertained that the membrane and electrode assembly in which the volume of fine pores of the catalyst layer is increased in the thickness direction toward the above polymer electrolyte membrane from the vicinity of the gas diffusion layer exhibits improved water holding properties of the catalyst layer and its power generation characteristic in low humidification is shown to be equivalent to the power generation characteristic in full humidification. In addition, the results of the power generation characteristics of the membrane and electrolyte assemblies of Reference Example 1 and Comparative Example 1 have ascertained that the membrane and electrode assembly of Reference Example 1 improves water holding properties without inhibiting removal performance of the water generated by the electrode reaction and its power generation characteristic in low humidification is indicated to be equivalent to that in full humidification.

Then, Example 1 and Comparative Example 2 will be described.

Example 2

Preparation of a Catalyst Ink

A platinum-carrying carbon catalyst having an amount of platinum carried of 50% by mass (Brand name: TEC10E50E, made by Tanaka Kikinzoku Kogyo) was mixed with 20% by mass of a polymer electrolyte solution (Nafion®, made by Du Pont Corp.) in a solvent and the resulting mixture was dispersed for 30 minutes by a planet-type ball mill (Brand name: Pulverisette7, made by Fritsch GmbH). The pot and the ball of the ball mill used were made from zirconia.

A starting material having a composition ratio of platinum-carrying carbon to a polymer electrolyte (Nafion®, made by Du Pont Corp.) being 2:1 (in terms of mass) was represented by catalyst ink 2.

The solvent was made to have a volume ratio of 1-propanol to 2-propanol being 1:1. Moreover, the content of solid matter was set to be 10% by mass.

[Substrate]

A polytetrafluoroethylene (PTFE) sheet was used as the transfer sheet.

[Method of Fabricating a Catalyst Layer]

The substrate was fixed on a plate in which water at 25° C. was circulated and the catalyst ink was applied onto the substrate with a doctor blade and then the substrate was dried for 30 minutes within an oven set at 70° C. while the substrate temperature was maintained at 25° C. using the plate to produce a catalyst layer.

The thickness of the catalyst layer was adjusted such that the amount of platinum carried was about 0.3 mg/cm$^2$.

Comparative Example 2

Preparation of a Catalyst Ink

The catalyst ink described in Example 1 was used.
[Substrate]
The substrate described in Example 1 was used.
[Method of Fabricating a Catalyst Layer]
The substrate was fixed on an aluminum plate (5 mm in thickness) that readily follows temperature change and dried at 70° C. for 30 minutes in the atmosphere to produce a catalyst layer. The thickness of the catalyst layer was adjusted such that the amount of platinum carried was about 0.3 mg/cm$^2$.

(Fabrication of a Membrane and Electrode Assembly (MEA))

The substrates having formed thereon the catalyst layers produced in Example 1 and Comparative Example 2 were each stamped into a square of 25 cm$^2$, and transfer sheets were disposed so as to face both sides of the polymer electrolyte membrane (Nafion®, made by Du Pont Corp.) and the resulting laminate was subjected to hot press at 130° C. and 6.0×10$^6$ Pa to obtain a membrane and electrode assembly (MEA) illustrated in FIG. 1.

(Evaluation)
[Observation of Cross-Sectional Shape]

The cross-sectional shapes in the vicinity of the polymer electrolyte membrane and in the vicinity of the surface (opposite to the polymer electrolyte membrane) in a cross section of the catalyst layer were observed under a scanning electron microscope (Brand name: S-4500, made by Hitachi Ltd.).

[Power Generation Characteristics]

Carbon cloths as gas diffusion layers were affixed to the membrane and electrolyte assemblies of Example 1 and Comparative Example 2 so as to sandwich them and the resulting materials were placed within a power generation evaluation cell (made by NF Corp.). This material was subjected to current voltage measurement at a cell temperature of 80° C. under two operating conditions noted below using a fuel cell measuring device (Brand name: GFT-SG1, made by Toyo Technica Inc.). The flow rate was controlled to make the utilization factor constant using hydrogen as the fuel gas and air as the oxidant gas. In addition, the back pressure was set at 100 kPa.

Full humidification: Anode 100% RH and cathode 100% RH

Low humidification: Anode 20% RH and cathode 20% RH (Measurement Results)
[Observation of Cross-Sectional Properties]

FIG. 6 shows a scanning electron microscope (SEM) photograph of a cross section of the catalyst layer, in the vicinity of the polymer electrolyte membrane, of the membrane and electrode assembly fabricated in Example 1.

FIG. 7 shows a scanning electron microscope (SEM) photograph of a cross section in the vicinity of the surface (opposite to the polymer electrolyte membrane) in the catalyst layer of the membrane and electrode assembly fabricated in Example 1.

In FIGS. 6 and 7, the cross-sectional shapes of the catalyst layers on the polymer electrolyte membrane side and on the surface side (opposite to the polymer electrolyte membrane) fabricated in Example 1 are greatly different from each other and the fine pore shapes are shown to be changed.

In addition, the catalyst layer of the membrane and electrode assembly fabricated in Example 1 was divided into two in the thickness direction and the fine pores were measured using a mercury porosimeter (Brand name: Pascal 140/240, made by ThermoQuest Corp.).

As a result, the volume of fine pores of the catalyst layer on the polymer electrolyte membrane side was increased as compared with the volume of fine pores of the catalyst layer of the surface of the catalyst layer, and its difference was 0.22 mL/g-(catalyst layer).

On the other hand, the catalyst layer produced in Comparative Example 2 was similarly observed and the cross-sectional shapes on the polymer electrolyte membrane side and on the surface side (opposite to the polymer electrolyte membrane) were not significantly different as compared with Example 1.

[Power Generation Characteristics]

The power generation characteristics of the membrane and electrolyte assemblies (MEA) produced in Example 1 and Comparative Example 2 are illustrated in FIG. 8.

In FIG. 8, the bold solid line (Example 1) indicates a power generation characteristic in low humidification of the membrane and electrode assembly and the bold dotted line (Example 1) indicates a power generation characteristic in full humidification of the membrane and electrode assembly. On the other hand, in FIG. 8, the thin solid line shows a power generation characteristic in low humidification of the membrane and electrode assembly of Comparative Example 2, and the thin dotted line shows a power generation characteristic in full humidification of the membrane and electrode assembly of Comparative Example 2.

The results of the power generation characteristics of the membrane and electrolyte assemblies of Example 1 and Comparative Example 2 have ascertained that the membrane and electrode assembly in which the volume of fine pores of the catalyst layer is increased in the thickness direction toward the above polymer electrolyte membrane from the vicinity of the gas diffusion layer exhibits improved water holding properties of the catalyst layer and its power generation characteristic in low humidification is shown to be equivalent to the power generation characteristic in full humidification. In addition, the results of the power generation characteristics of the membrane and electrode assemblies of Example 1 and Comparative Example 2 have ascertained that the membrane and electrode assembly of Example 2 improves water holding properties without inhibiting removal performance of the water generated by the electrode reaction and its power generation characteristic in low humidification is indicated to be equivalent to that in full humidification.

INDUSTRIAL APPLICABILITY

The membrane and electrode assembly of the present invention is a membrane and electrode assembly produced by sandwiching a polymer electrolyte membrane between a pair of catalyst layers, in which the catalyst layer comprises particles carrying a polymer electrolyte and a catalyst material, and in which the volume of fine pores having a diameter of 1.0 µm or smaller in terms of cylinder approximation for fine pores evaluated by the mercury intrusion method in the catalyst layer is increased toward the above polymer electrolyte membrane (the inside) from the surface of the catalyst layer (the outside). The distribution of the volumes of fine pores in the thickness direction of the catalyst layer is improved and the volume of fine pores in the thickness direction is increased toward the polymer electrolyte membrane from the vicinity of the gas diffusion layer, whereby the water holding properties of the catalyst layer can be improved without inhibiting the diffusibility of the reactant gas, the removal of the water generated by the electrode reaction, etc. Further, a decrease in power generation characteristics due to an increase in interface resistance is not recognized differently than the application of conventional humidity controlling membranes or the handling to low humidification by formation of grooves to the surface of the catalyst layer and the polymer electrolyte membrane fuel cell comprising the inventive membrane and electrode assembly has a remarkable effect of offering high power generation characteristics even under low humidified conditions as compared with the polymer electrolyte membrane fuel cell comprising the conventional membrane and electrode assembly, so that its industrial availability is high.

EXPLANATION OF REFERENCE NUMERALS

Figure 1:
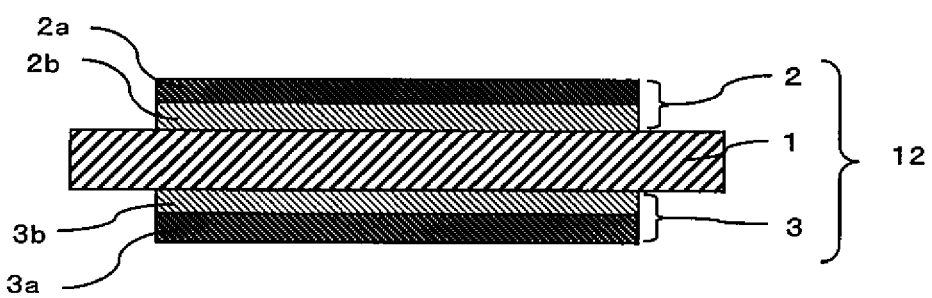
FIG. 1(a) is a schematic sectional view of a membrane and electrode assembly of Reference Example 1.
FIG. 1(b) is a schematic sectional view of a membrane and electrode assembly of the present invention.
Figure 1:
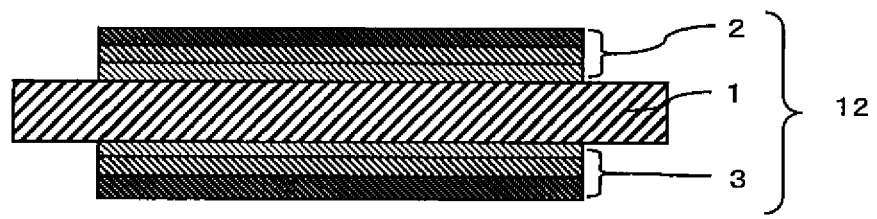
Figure 2:
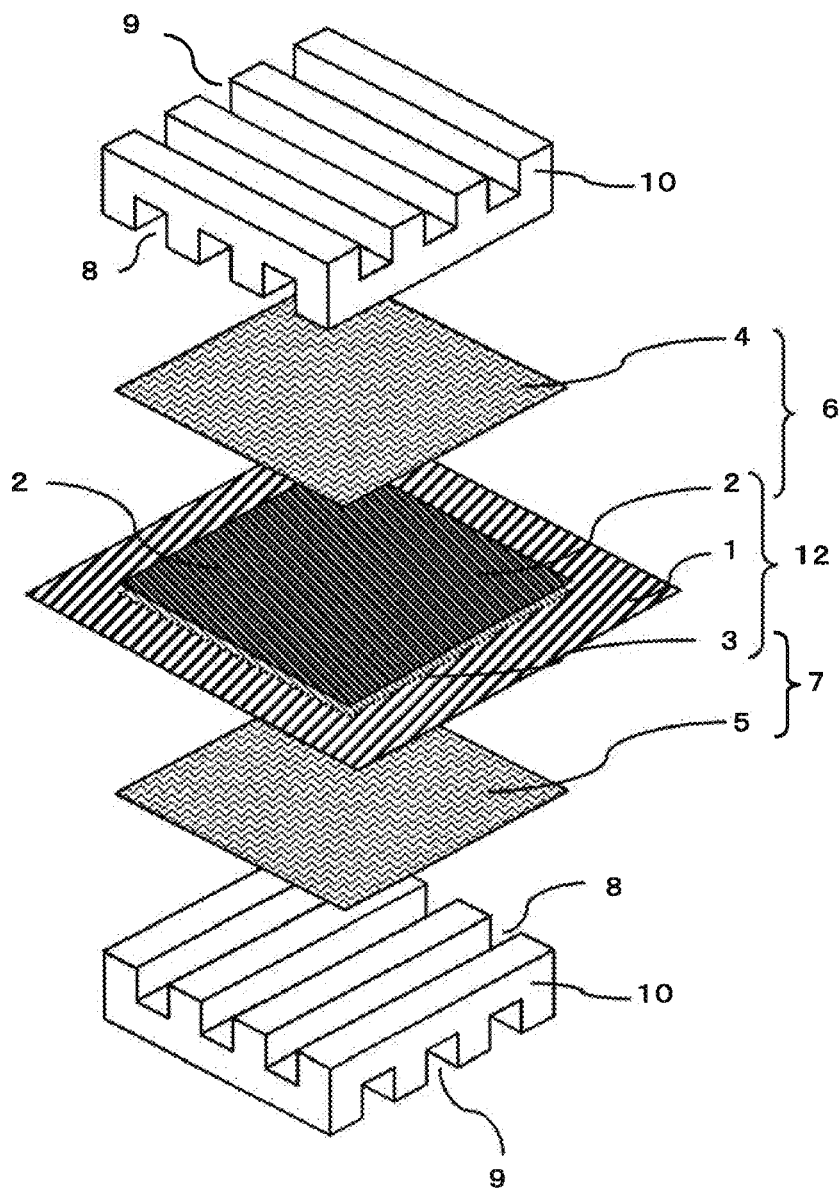
FIG. 2 is an exploded schematic diagram of a polymer electrolyte membrane fuel cell of the present invention.
Figure 3:
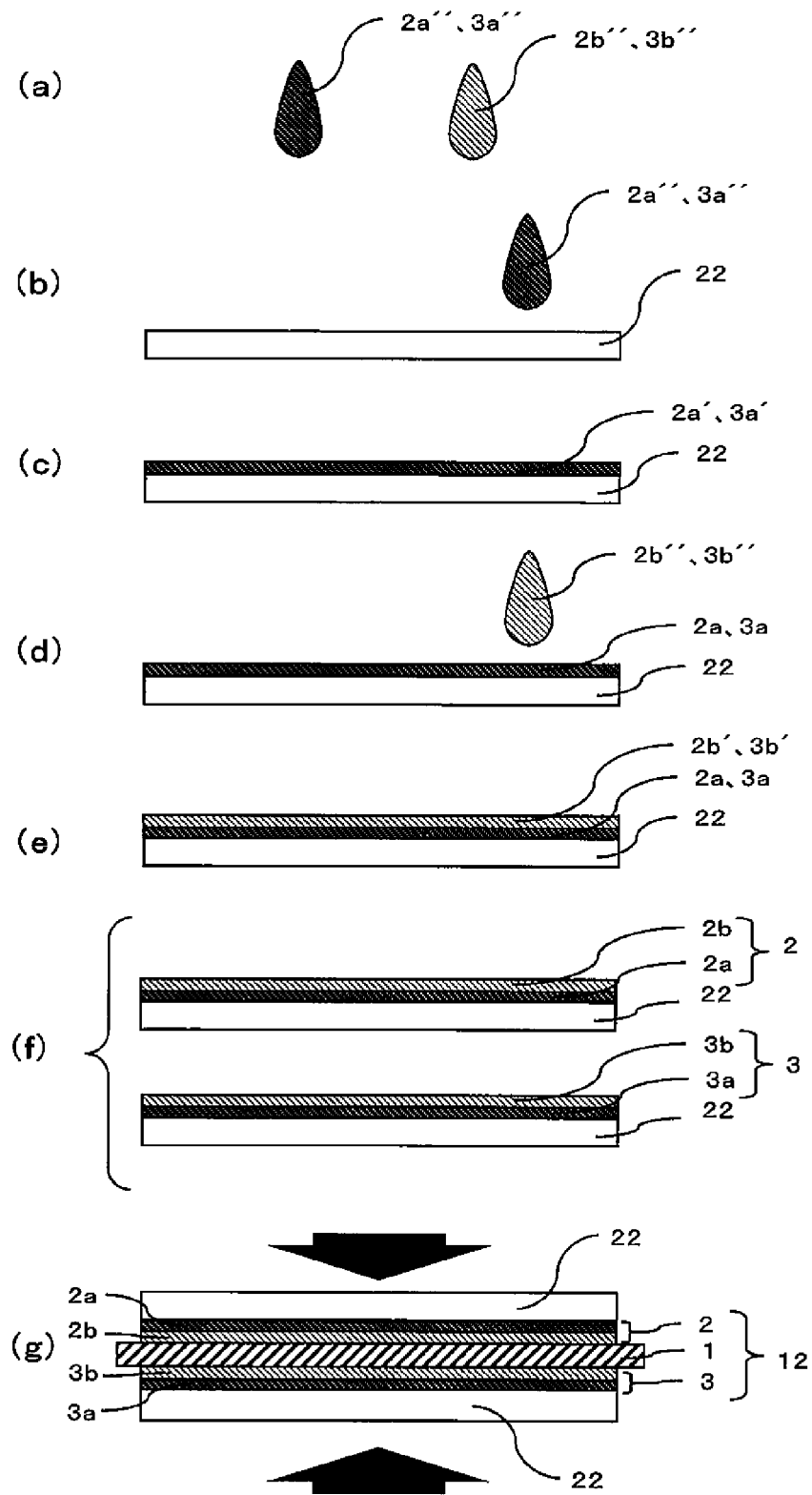
FIG. 3 is an explanatory view of a first method of producing a membrane and electrode assembly for reference.
Figure 4:
FIG. 4 is an explanatory view of a first method of producing a membrane and electrode assembly of the present invention.
Figure 4:
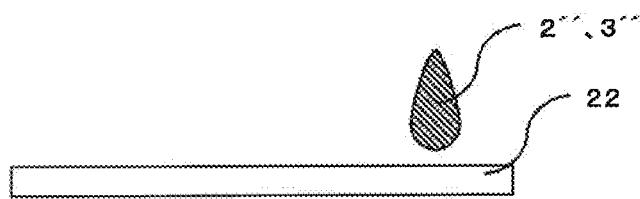
Figure 4:
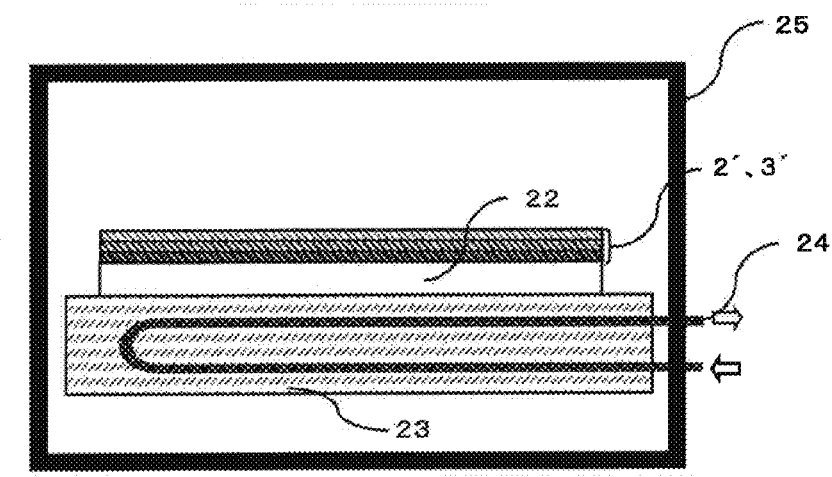
Figure 4:
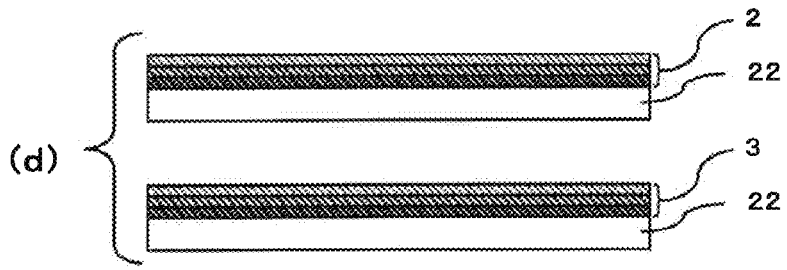
Figure 4:
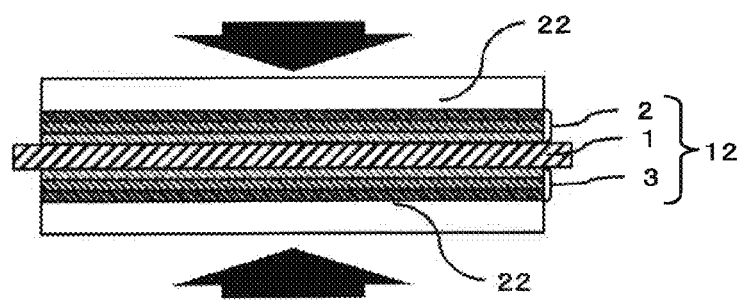
Figure 5:
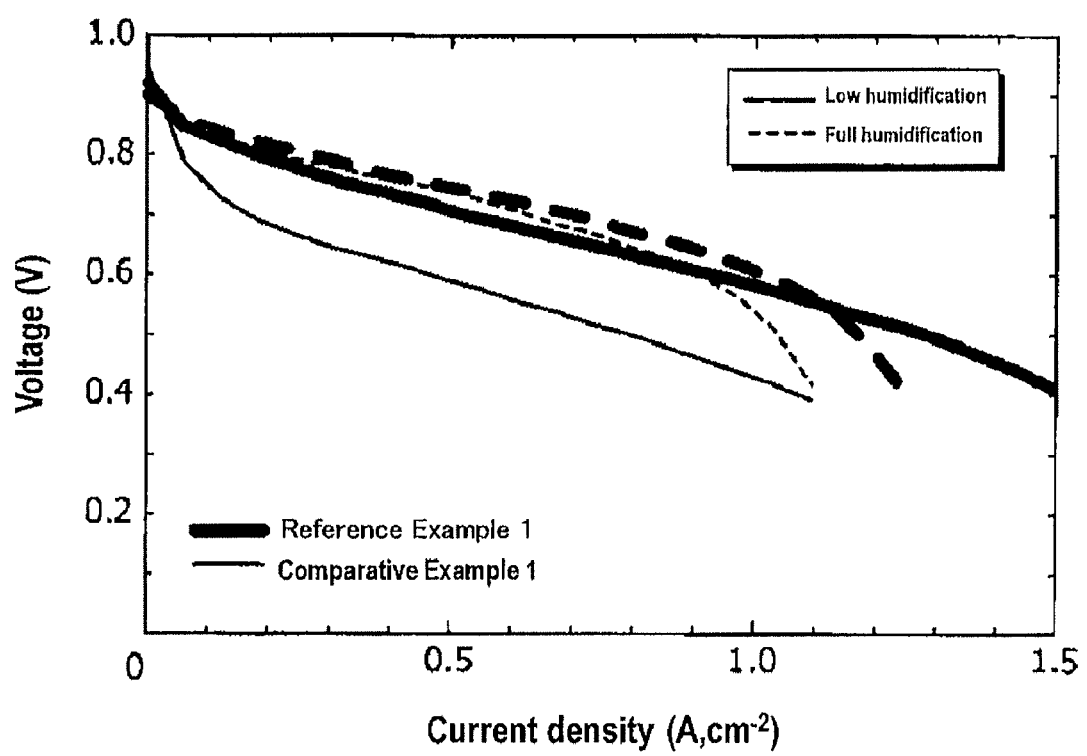
FIG. 5 shows power generation characteristics of the membrane and electrolyte assemblies produced in Reference Example 1 and Comparative Example 1.
Figure 6:
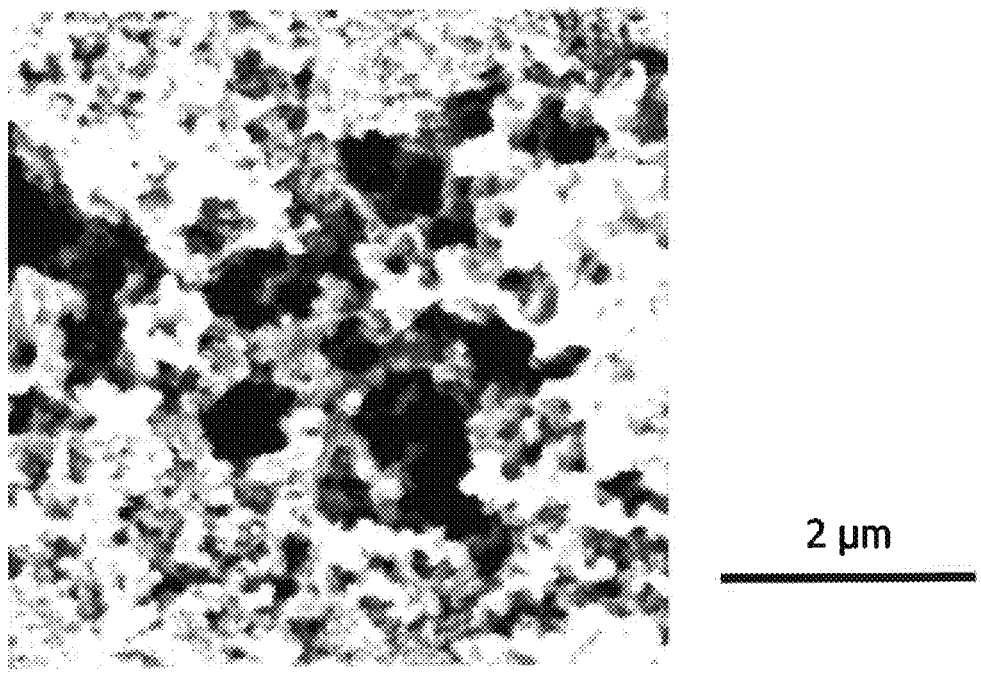
FIG. 6 shows a scanning electron microscope (SEM) photograph of a cross section, in the vicinity of the polymer electrolyte membrane, in the catalyst layer of the membrane and electrode assembly fabricated in Example 1.
Figure 7:
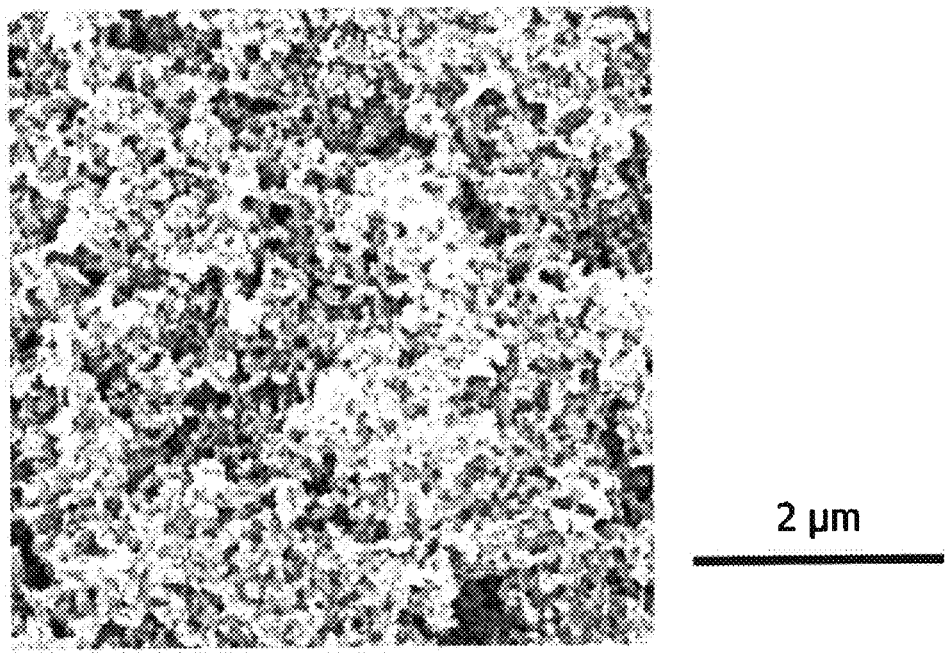
FIG. 7 shows a scanning electron microscope (SEM) photograph of a cross section, in the vicinity of the surface side (opposite to the polymer electrolyte membrane) in the catalyst layer of the membrane and electrode assembly fabricated in Example 1.
Figure 8:
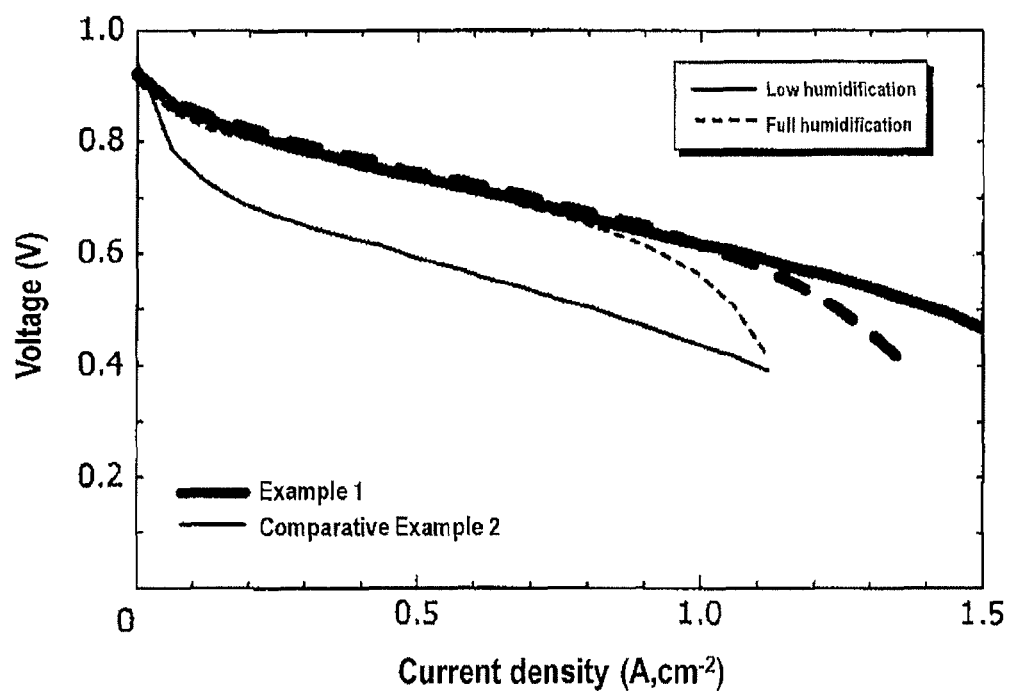
FIG. 8 shows power generation characteristics of the membrane and electrolyte assemblies fabricated in Example 1 and Comparative Example 2.

1 Polymer electrolyte membrane
2 Catalyst layer
3 Catalyst layer
12 Membrane and electrode assembly
4 Gas diffusion layer
5 Gas diffusion layer
6 Cathode
7 Anode
8 Gas passage
9 Cooling water passage
10 Separator
2a" Catalyst ink (having a small volume of fine pores of the catalyst layer to be formed)
2b" Catalyst ink (having a large volume of fine pores of the catalyst layer to be formed)
3a" Catalyst ink (having a small volume of fine pores of the catalyst layer to be formed)
3b" Catalyst ink (having a large volume of fine pores of the catalyst layer to be formed)
2a' Coating film of a catalyst ink. (having a small volume of fine pores of the catalyst layer to be formed)
2b' Coating film of a catalyst ink (having a large volume of fine pores of the catalyst layer to be formed)
3a' Coating film of a catalyst ink (having a small volume of fine pores of the catalyst layer to be formed)
3b' Coating film of a catalyst ink (having a large volume of fine pores of the catalyst layer to be formed)
22 Substrate
23 Cooling stage
24 Cooling mechanism
25 Oven

The invention claimed is:

1. A method of producing a membrane and electrode assembly produced by sandwiching a polymer electrolyte membrane between a pair of catalyst layers,
wherein there is produced a membrane and electrode assembly comprising a catalyst layer in which the volume of fine pores with a diameter of 1.0 μm or smaller in terms of cylinder approximation for fine pores evaluated by the mercury intrusion method is increased toward the polymer electrolyte membrane (the inside) from the surface of the catalyst layer (the outside), the method comprising:
dispersing particles carrying a catalyst material and a polymer electrolyte in a solvent to produce a catalyst ink;
applying the catalyst ink onto a substrate selected from a gas diffusion layer and a transfer sheet to form a coating film, drying the coating film to remove the solvent in the coating film and to form a catalyst layer, a step of giving a temperature to the opposite side of the substrate of the coating film higher than a temperature to the face of the coating film on the substrate side in the thickness direction of the coating film when the coating film formed on the substrate is dried to remove the solvent; and
joining the catalyst layer formed on the substrate to the polymer electrolyte membrane.

2. The method of producing the membrane and electrode assembly according to claim 1, wherein in the drying of the coating film, the temperature given to the surface opposite to the substrate of the coating film is from [(temperature given to substrate side)+5° C.] to 150° C., both inclusive.

3. The method of producing the membrane and electrode assembly according to claim 2, wherein means for giving a temperature to the face of the coating film on the substrate side as means for giving a temperature to the substrate with the substrate fixed on a plate including a temperature controlling mechanism.

4. The method of producing the membrane and electrode assembly according to claim 3, wherein the temperature controlling mechanism is a cooling mechanism.

5. The method of producing the membrane and electrode assembly according to claim 4, wherein the temperature given to the face of the coating film on the substrate is 0° C. or higher.

6. The method of producing the membrane and electrode assembly according to claim 5, wherein in applying the catalyst ink, the catalyst ink is applied onto the substrate fixed on the plate.

7. The method of producing the membrane and electrode assembly according to claim 6, wherein a temperature on the plate is constant.

8. A membrane and electrode assembly produced by the manufacturing method according to claim 1.

9. A polymer electrolyte membrane fuel cell, wherein the membrane and electrolyte assembly according to claim 1 is sandwiched between a pair of gas diffusion layers and further, the membrane and electrode assembly sandwiched with the gas diffusion layers is sandwiched between a pair of separators.

* * * * *